US012579086B2

(12) United States Patent
Ben-Rubi

(10) Patent No.: US 12,579,086 B2
(45) Date of Patent: Mar. 17, 2026

(54) DATA STORAGE WITH LOW COST DIES

(71) Applicant: Sandisk Technologies, Inc., Milpitas, CA (US)

(72) Inventor: Refael Ben-Rubi, Rosh Haayln (IL)

(73) Assignee: Sandisk Technologies, Inc., Milpitas, CA (US)

( * ) Notice: Subject to any disclaimer, the term of this patent is extended or adjusted under 35 U.S.C. 154(b) by 279 days.

(21) Appl. No.: 18/351,363

(22) Filed: Jul. 12, 2023

(65) Prior Publication Data

US 2024/0119016 A1 Apr. 11, 2024

Related U.S. Application Data

(60) Provisional application No. 63/415,167, filed on Oct. 11, 2022.

(51) Int. Cl.
*G06F 13/16* (2006.01)
*G06F 9/30* (2018.01)

(52) U.S. Cl.
CPC ...... *G06F 13/1689* (2013.01); *G06F 9/30189* (2013.01); *G06F 13/1621* (2013.01)

(58) Field of Classification Search
CPC ........................... G06F 13/1689; G06F 9/3877
See application file for complete search history.

(56) References Cited

U.S. PATENT DOCUMENTS 8,058,897 B1 11/2011 Lu et al.
10,642,513 B2 5/2020 Marcu et al.

11,226,767 B1 1/2022 Johnson et al.
11,256,591 B2 2/2022 Alrod et al.
2016/0313914 A1* 10/2016 Koets .................... G06F 3/0659
2018/0173659 A1* 6/2018 DenBoer ............... G06F 13/124
2021/0157519 A1* 5/2021 Dash ..................... G06F 3/0659

OTHER PUBLICATIONS

Jung, Myoungsoo et al. "NANDFlashSim: High-Fidelity, Microarchitecture-Aware NAND Flash Memory Simulation" vol. 12, No. 2, Article 6, Publication: Jan. 2016.

* cited by examiner

*Primary Examiner* — Gary W. Cygiel
(74) *Attorney, Agent, or Firm* — Patterson + Sheridan, LLP

(57) ABSTRACT

The present disclosure generally relates to improved command processing by separating all state machines into multiple groups. Rather than having one general die that can process any command, this disclosure suggests distributed processing commands by having two types of dies. A slave die will contain the flash array and implementation of state machine that is related to fast operations, and will not include state machines of slow operations. A master die will contain implementation of fast state machine (to support fast commands to the flash array that connected to the master die) and implementation of slow command state machine. The master die will have one instance of the slow state machine implementation, but that slow state machine will be able to be loaded with variables that represent the slow states of all the other dies. The commands processing is based the most suitable state machine for the specific command.

20 Claims, 7 Drawing Sheets

200

| Operation | Fast/Slow | Destination |
|---|---|---|
| Read Transfer | Fast | To The Specific Slave Die or Master Die |
| Write Transfer | Fast | To The Specific Slave Die or Master |
| Read Temperature | Slow | Master Die |
| Read Bad Column Information | Slow | Master Die |

DATA STORAGE WITH LOW COST DIES

CROSS-REFERENCE TO RELATED APPLICATIONS

This application claims benefit of U.S. Provisional Patent Application Ser. No. 63/415,167, filed Oct. 11, 2022, which is herein incorporated by reference.

BACKGROUND OF THE DISCLOSURE

Field of the Disclosure

Embodiments of the present disclosure generally relate to improved command processing by separating all state machines into multiple groups.

Description of the Related Art

A data storage device uses flash dies. The number of dies in one memory application specific integrated circuit (ASIC) can be 1, 2, 4, 8, 16, 32, or 64 dies. All the dies are the same but, are not working in parallel. The dies contain gates that implement hundreds of state machines, each related to specific commands that can be used in the flash interface. Each die has to process all sequences received. In some instances when one command is sent, the command needs to be saved to a local storage inside the die until another command is received. This is not optimal because the data storage device has redundant ability that is expensive when processing all sequences is not needed.

Therefore, there is a need in the art for improved command processing by separating all state machines into multiple groups.

SUMMARY OF THE DISCLOSURE

The present disclosure generally relates to improved command processing by separating all state machines into multiple groups. Rather than having one general die that can process any command, this disclosure suggests distributed processing commands by having two types of dies. The first (i.e., slave die) will contain the flash array and implementation of state machine that is related to fast operations. The slave die will not include state machines of slow operations. The second (i.e., master die) will contain implementation of fast state machine (to support fast commands to the flash array that connected to the master die) and implementation of slow command state machine. The master die will have one instance of the slow state machine implementation, but that slow state machine will be able to be loaded with variables that represent the slow states of all the other dies. The commands processing is based the most suitable state machine for the specific command. The process begins by determining which group a command should be sent to. The command can be sent to a first group in which the state machine requires real time operations. Alternatively, the command can be sent to a second group in which the state machine does not require real time operations. The system will determine which group receives what operations. A master die receives the both first and second group's commands (slow operations for other dies and for the master die itself, fast operations only for the master die itself) and a slave die receives the second group commands. The master die runs in a loop that determines which slave die needs an operation to perform. Once determined, the state machine of the master generates an operation for the slave die to perform.

In one embodiment, a data storage device comprises: a memory device, wherein the memory device comprises a master die and one or more slave dies, and wherein the master die is configured to direct real time operations and the non-real time operations to the one or more slave dies; and a controller coupled to the memory device, wherein the controller is configured to: direct real-time operations to the master die or to one or more slave dies; and direct the non-real time operations to the master die.

In another embodiment, a data storage device comprises: a memory device comprising a plurality of dies; and a controller coupled to the memory device, the controller comprising: one or more flash interface modules (FIMs) coupled to the plurality of dies; and a slow state machine controller coupled to the one or more FIMs, wherein the controller is configured to: send real-time operations through the one or more FIMs to one of more dies of the plurality of dies; and send state machine output to the one or more dies for non-real time operations.

In another embodiment, a data storage device comprises: memory means; and a controller coupled to the memory means, wherein the controller includes a plurality of flash interface modules (FIMs), and wherein the controller is configured to: direct real-time operations to a first location of the memory means; direct parallel processing operations to the first location of the memory means; direct non-real time operations to one or more second locations of the memory means; and direct operations that do not require parallel processing to the one or more second locations of the memory means, wherein the one or more second locations of the memory means are configured to send output information from a state machine to the first location of the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table illustrating mapping of flash commands, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved command processing by separating all state machines into multiple groups. Rather than having one general die that can process any command, this disclosure suggests distributed processing commands by having two types of dies. A slave die will contain the flash array and implementation of state machine that is related to fast operations, and will not include state machines of slow operations. A master die will contain implementation of fast state machine (to support fast commands to the flash array that connected to the master die) and implementation of slow command state machine. The master die will have one instance of the slow state machine implementation, but that slow state machine will be able to be loaded with variables that represent the slow states of all the other dies. The commands processing is based the most suitable state machine for the specific command.

Figure 1:
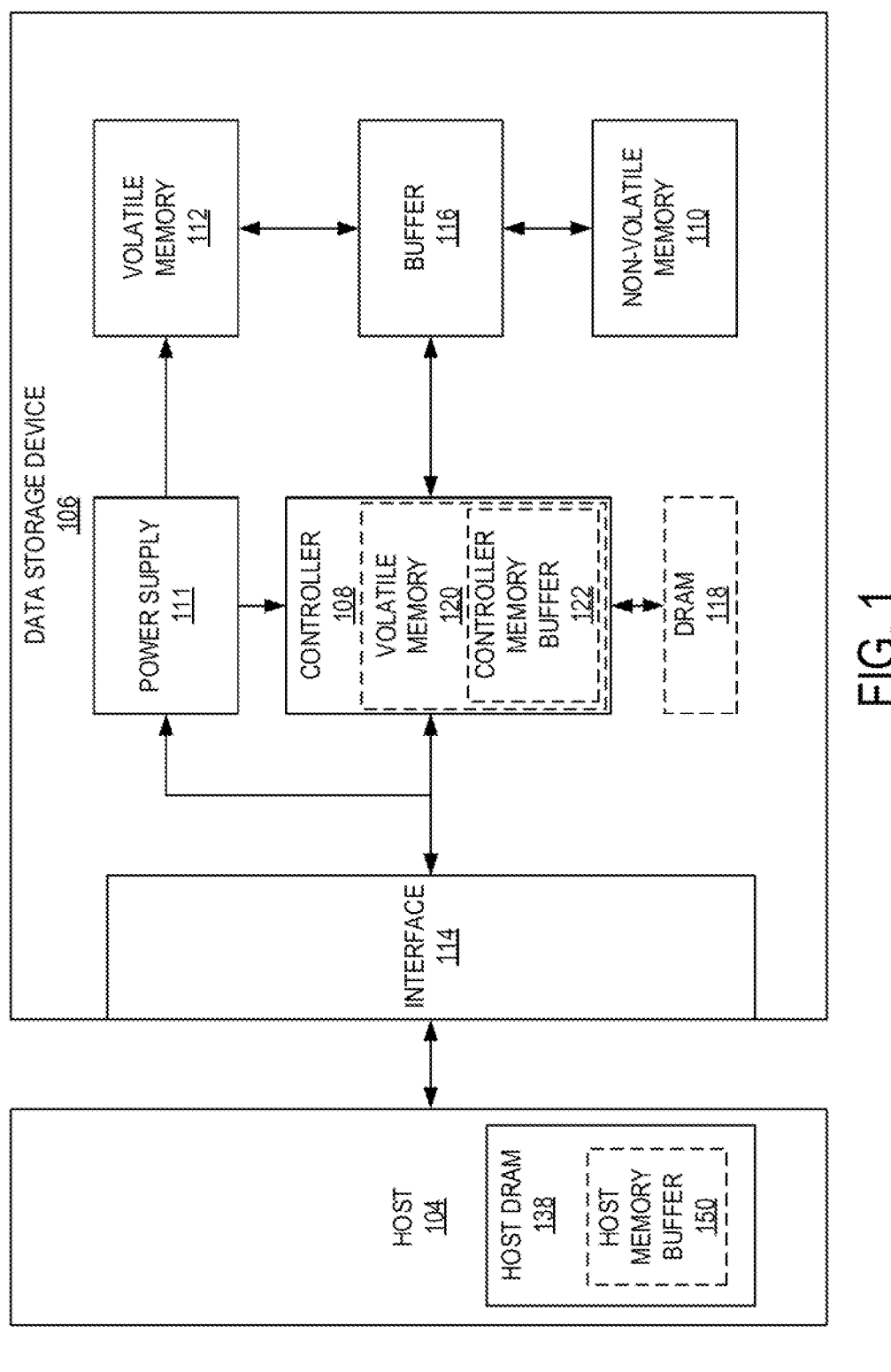
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory

112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As discussed herein, the state machines in flash can all be separated into two groups: Group A and Group B. For Group A, the state machines will be: state machines that require real time operations (e.g., read transfer state machines); state machines that requires parallel processing (e.g., all bit XOR operations between two buffers); and state machines that may be sensitive to signal integrity because the state machines use a high clock (e.g., a state machine that is related to clock calibration). It is to be noted that the exemplified Group A state machines are for example only. Additional state machines are contemplated.

For Group B state machines, the opposite of Group A state machines are contemplated. For example, state machines that do not require real time operations (e.g., read temperature state machines); state machines that do not require parallel processing (e.g., read flash ID state machines); and state machines that are not sensitive to signal integrity because the state machines uses, or can use, a low clock (e.g., a state machines that is related to bad columns management). It is to be noted that the exemplified Group B state machines are for example only. Additional state machines are contemplated.

In practice, there can be a first die type (e.g., a master die) that contains: the flash array; all state machines described for Group A; one implementation of state machine logic that is described for Group B and will support all other dies; the flash interface; analog modules; serial wire connection to all other dies; and serial communication means to communicate to all of the other dies. There is only one instance of the implementation of the slow state machines. The state variable per die is saved in RAM inside of the master die, and the control logic inside the master die runs in a loop and checks which die needs to be served. When such die is found, the state variables are loaded to the state machine of the die and the die receives the processing time.

The second die type (e.g., slave die) can contain the flash array; all state machines that are described in Group A; a flash interface for fast commands; analog modules; serial wire connection to the master die; and serial communication means to communicate with the master die. Note that the slave die does not contain the state machine gates implementation that is described in Group B.

All of the dies are communication with the FIM using the flash interface for data transfer that needs to be fast and can happen in parallel to all dies. Real time operations such as read transfer and write transfer are done by each die alone as currently occurs. Slow operations are managed by the master die. A low level flash sequencer (LLFS) will be connected, using the FIM, to the master die and the slave dies. The LLFS CPUs will send, through the FIM, slow operations to the master die and faster operations directly to each specific slave die. In order to process, the dies will have a table that maps the flash commands to master or to slave.

FIG. 2 is a table 200 illustrating mapping of flash commands, according to certain embodiments. The table 200 displays different operations, along with the speed and destination of the operations. When each die finishes a corresponding operation, the die will report the completion to the master die by a read/busy flag or by sending register data that was read, for example. The master die will send the response to the FIM.

The read transfers and the write transfers are fast operations handled by specific slave dies. The slave dies handle fast operations, parallel operations, or single signaling integrity related operations. Operations such as reading temperatures and reading bad column information are slow operations. The slow operations are handled by the master die.

The read and write transfer operations are directed to the slave die. The read temperature and the read bad column operations are slow operations and will be directed to the master die. Table 200 is a table that exists inside the LLFS CPU. The LLFS receives a command from the data path CPU. The LLFS CPUs will be connected to the master die and the slave dies. Operations from the LLFS CPUs will send (through the FIM) slow operations to the master die and fast operations directly to the slave die. When each die finishes with a slow operation, the die will report to completion to the master die. The completion with be either a ready flag or a busy flag. Another option of reporting to the master die is, sending the registered data that was read to the master die.

Figures 3A, 3B:
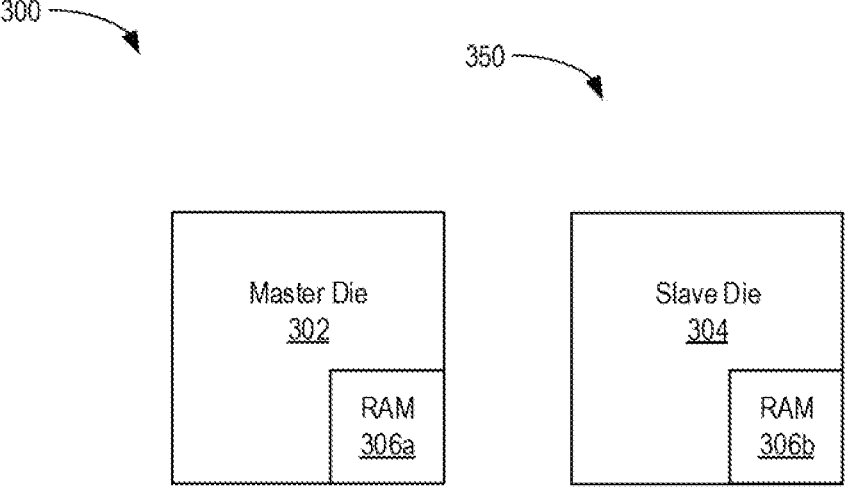
FIGS. 3A and 3B are schematic diagrams illustrating a master die and a slave die, according to certain embodiments.

FIGS. 3A and 3B are a schematic diagrams 300, 350 illustrating a master die and a slave die, according to certain embodiments. Diagram 300 displays a master die 302 while diagram 350 displays slave die 304. Both the master die 302 and slave die 304 have a RAM 306a, 306b. It is to be understood that though on one slave die 304 is shown in diagram 300, the diagram 300 may have more than one slave die 304.

The master die 302 contains a flash array. Furthermore, the master die 302 contains state machines that do not require real time operations. The state machines that do not require parallel processing (read flash ID) are found in the master die 302. The state machines that are not sensitive to signal integrity, because the state machines use (or can use) low clocks that are related to bad columns management are located in the master die 302. An implementations of state machine logic that describes state variables per die, are saved in the RAM 306a inside the master die 302. The control logic inside the master die 302 runs in a loop and checks which salve die 304 needs to be served. When such a die is found, the state variables of that slave are loaded to the state machine and it gets its processing time.

The slave die 304 contains a flash array. Furthermore, the slave die 304 contains state machines that require real time operations. The state machines that require parallel processing (all bit XOR operations between two buffers) are found in slave die 304. The state machines that are sensitive to signal integrity, because the state machines use high clocks that are related to clock calibration are located in the slave die 304. Flash interface and analog modules are found in the slave die 304. Serial wires are connected from the slave die 304 to the master die 302 for communication. The master die 302 can receive the fast commands, but simply for synchronization purposes. The master die does not handle fast commands which are instead handled by the slave dies.

Figure 4:
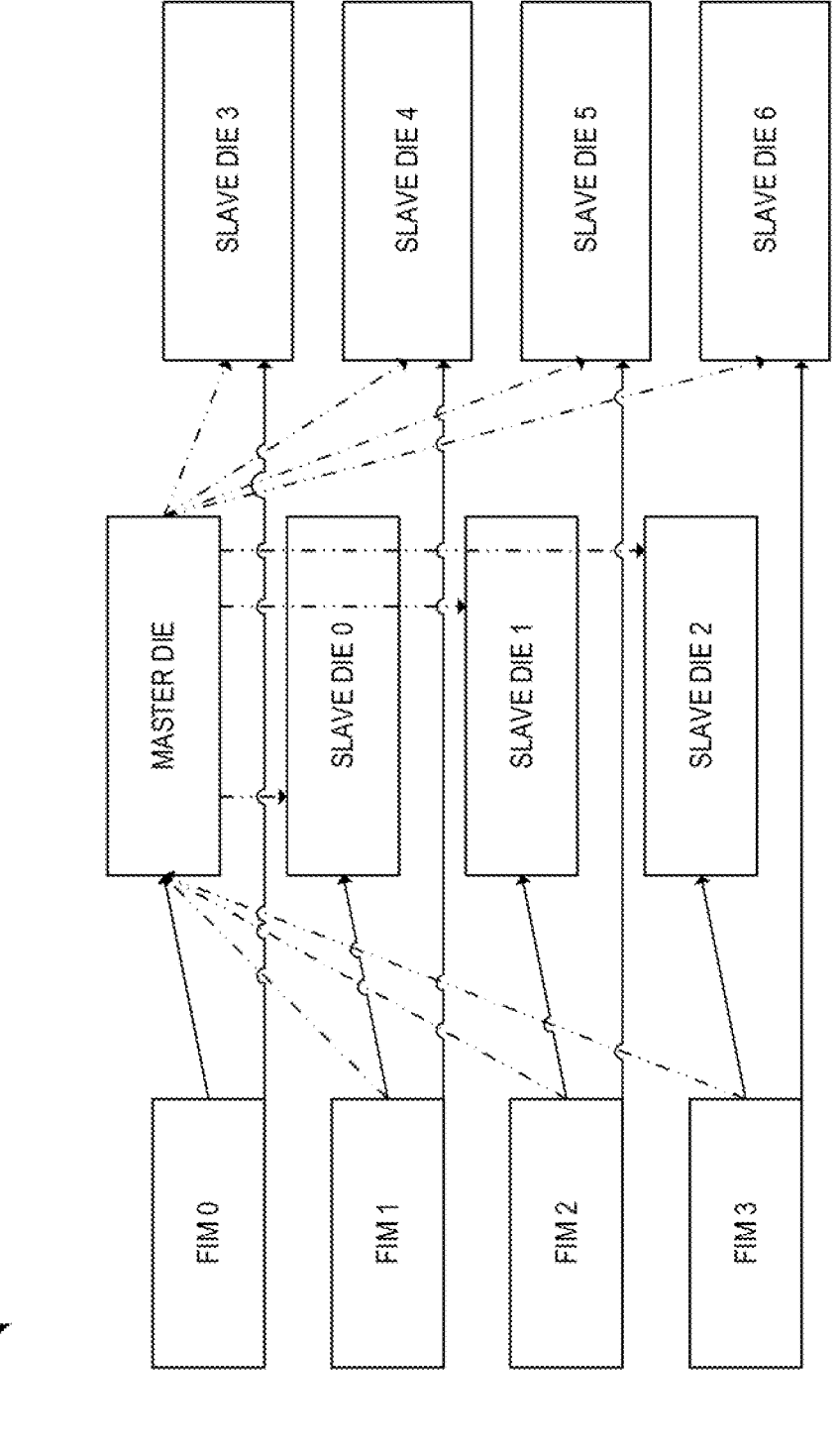
FIG. 4 is a table illustrating the mapping of commands, according to certain embodiments.

FIG. 4 is a schematic diagram illustrating a method 400 for processing commands, according to certain embodiments. Method 400 comprises multiple FIM's and multiple slave dies. It is to be understood that though there are four FIMs and seven slave dies, there can be more or less FIMs and slave dies than what is displayed in FIG. 4.

There is at least one master die. The other dies will be slave days. As seen in FIG. 4 there at seven slave dies. The master die is in communication with each slave die. The seven dies will be slave dies. The slave dies will hold all the fast logic, while the master die will hold slow logic. The slave dies will communicate through the serial wire with the master die. Both the master die and the slave die communicate with the FIM.

The master die also works with the flash array. The master die has a group of past logic in order to work with the flash array. The flash array is connected to the HIM. Since all of the slow logic is removed from the slave dies, at least one instance of slow logic is placed in the master die. The slave die will handle all fast state machine handing without the master die.

Previously, a HIM was simply connected to two dies, but with the master and slave dies, each FIM is connected to the master die and the master die is connected to each slave die. The connection between the master die and the slave dies are for the slow commands.

A table will be placed inside the master die. The table will contain the statuses or the local variables that applicable to all the other slave dies. The master die will get a trigger that one of the slave dies need slow state machine handling. When the master die is triggered the slow state machine will be activated. Once the slow state machine is activated the state variable will be loaded from a table specific. The table is specific to the slave die that needs the slow state machine handling. The master die will only know about the fast state machine handling once a slave dies sends the completion flag to the master die.

When the master die gets the ready flag or buy flag, the responses will be sent back to the FIM. Each FIM is connected to one or more slave dies. Also, the FIM includes a common larger neighbor. An address latch enables the write protect signal. Some of the write protect signals are related to the toggle mode. All the signals are connected between the FIM and the slave dies. By not having all the slave dies use the implementation of the slow state machine, this saves the system from using all the slow state machines.

Figure 5:
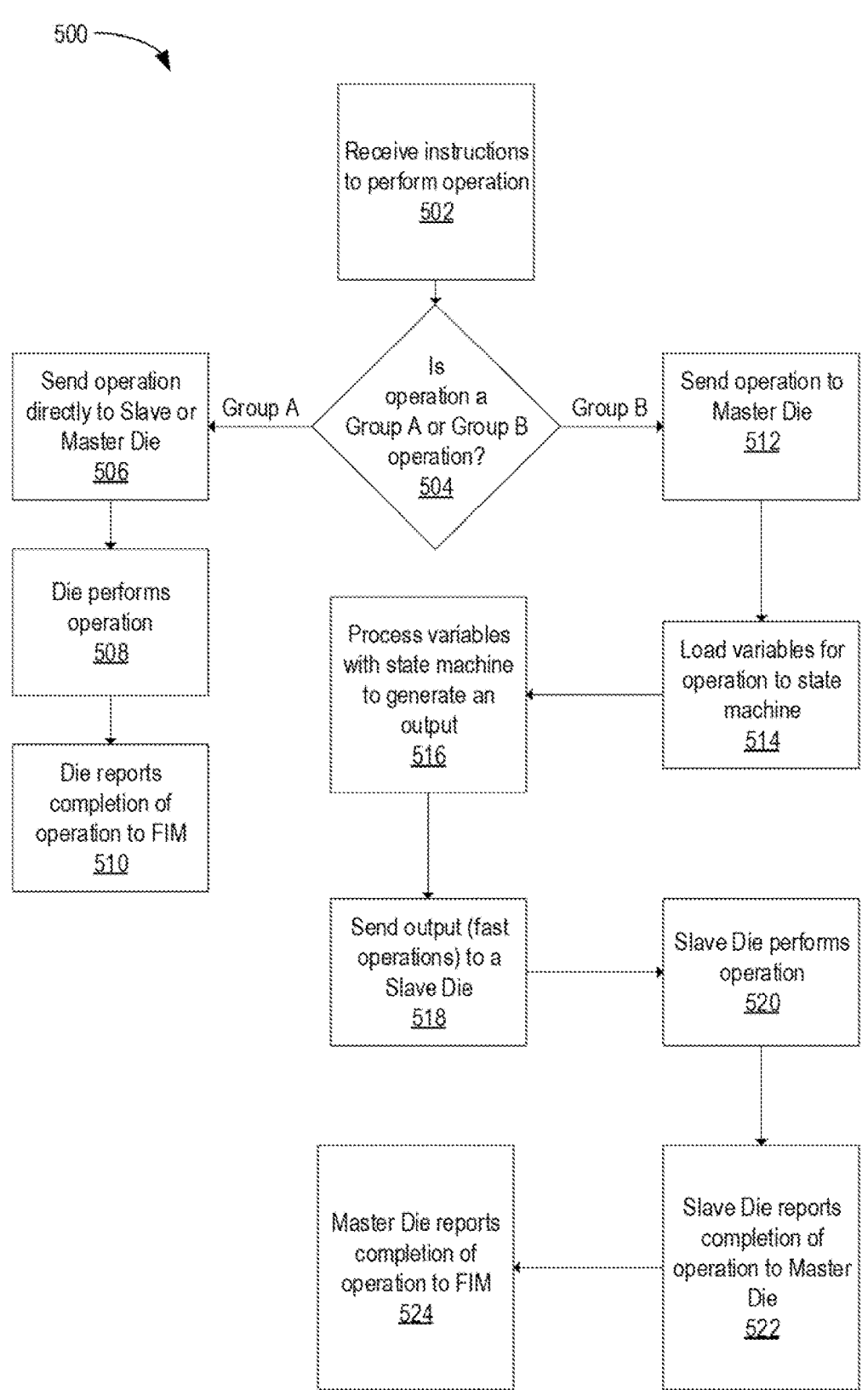
FIG. 5 is a flowchart illustrating a method for processing commands, according to certain embodiments.

FIG. 5 is a flowchart illustrating a method 500 for processing commands, according to certain embodiments. Method 500 is a constant cycle that runs as operations are received.

Method 500 begins at block 502. At block 502, the controller receives instructions to perform an operation. At block 504, the controller determines if the operation is either a Group A operation or a Group B operation. If the operation is a Group A operation, then method 500 proceeds to block 506. If the operation is a Group B operation, then method 500 proceeds to block 512. At block 506, if the operation is determined to be a Group A operation then the operation is sent directly to a slave die or to the master die. At block 508, the die (e.g., master or slave) performs the operation that was sent to the die at block 506. At block 510, the die reports the completion of the operation to the FIM.

At block 512, if the operation is determined to be a Group B operation then the operation is sent to the master die. At block 514, the master die loads variables for the operation to a state machine. At block 516, the variables are processed with the state machine to generate an output. At block 518, the output (fast operations only) is sent to a slave die. If a slow operation needs to be performed, the master die will perform the slow operation and not send the slow operation to the slave dies. At block 520 the slave die performs the operation (output) from block 518. At block 522, the slave die reports the completion of the operation of the master die. At block 524, the master die reports the completion of the operation to the FIM.

Figure 6:
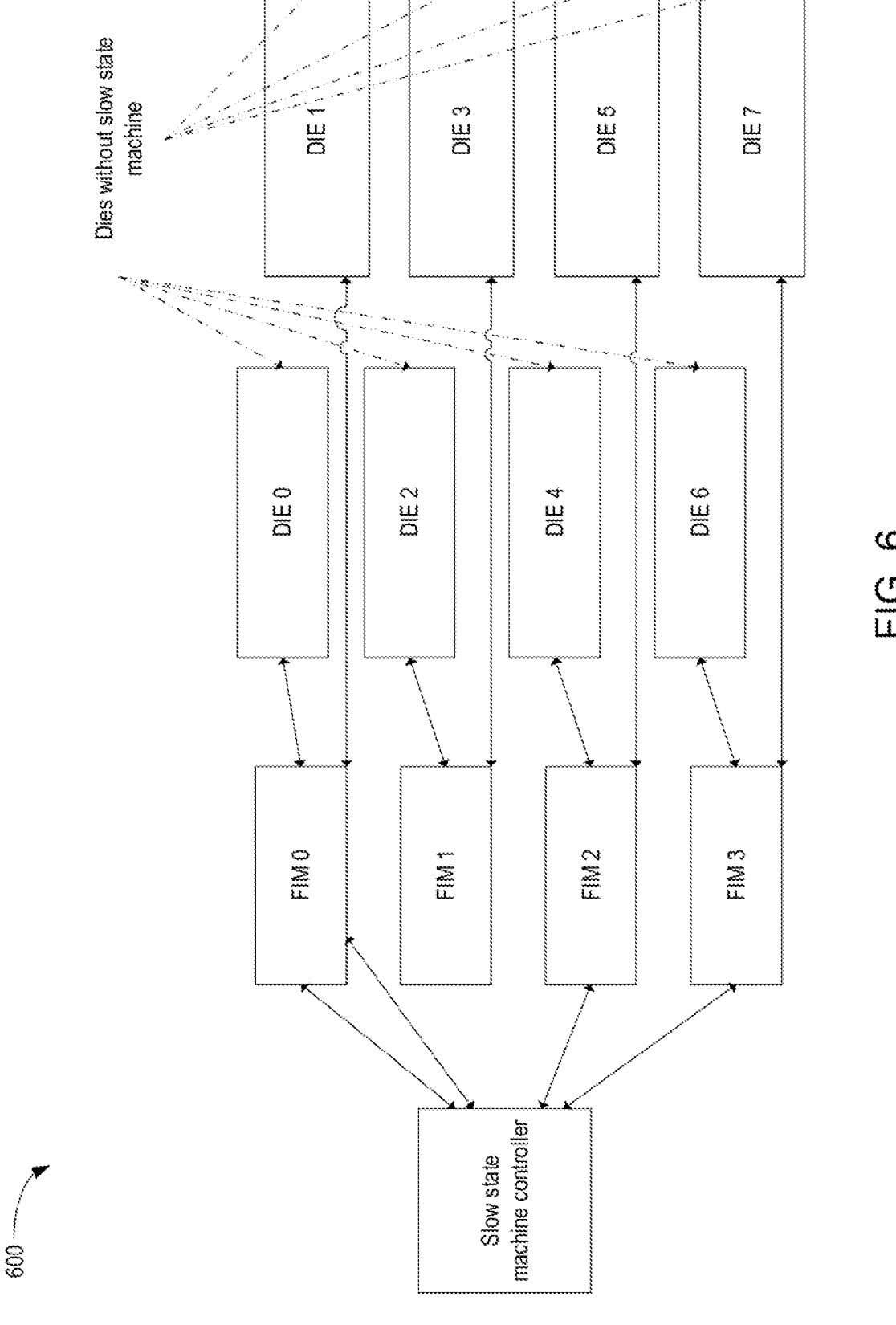
FIG. 6 is a schematic diagram illustrating a method for processing commands, according to certain embodiments.

In one embodiment, the slow logic may be placed directly into the controller. FIG. 6 is a schematic diagram illustrating a method 600 for processing commands, according to certain embodiments. There is at least one slow state machine controller. The other dies will be slave dies.

FIG. 6 will not have a master die or slave dies. All the dies in FIG. 6 are the same. Though the dies are the same, none of the dies will have a slow state machine. The slow state machine in the controller communicates with the dies using the flash interface as mentioned above. The slow state machine controller will perform the functions of the master die in FIG. 4.

Figure 7:
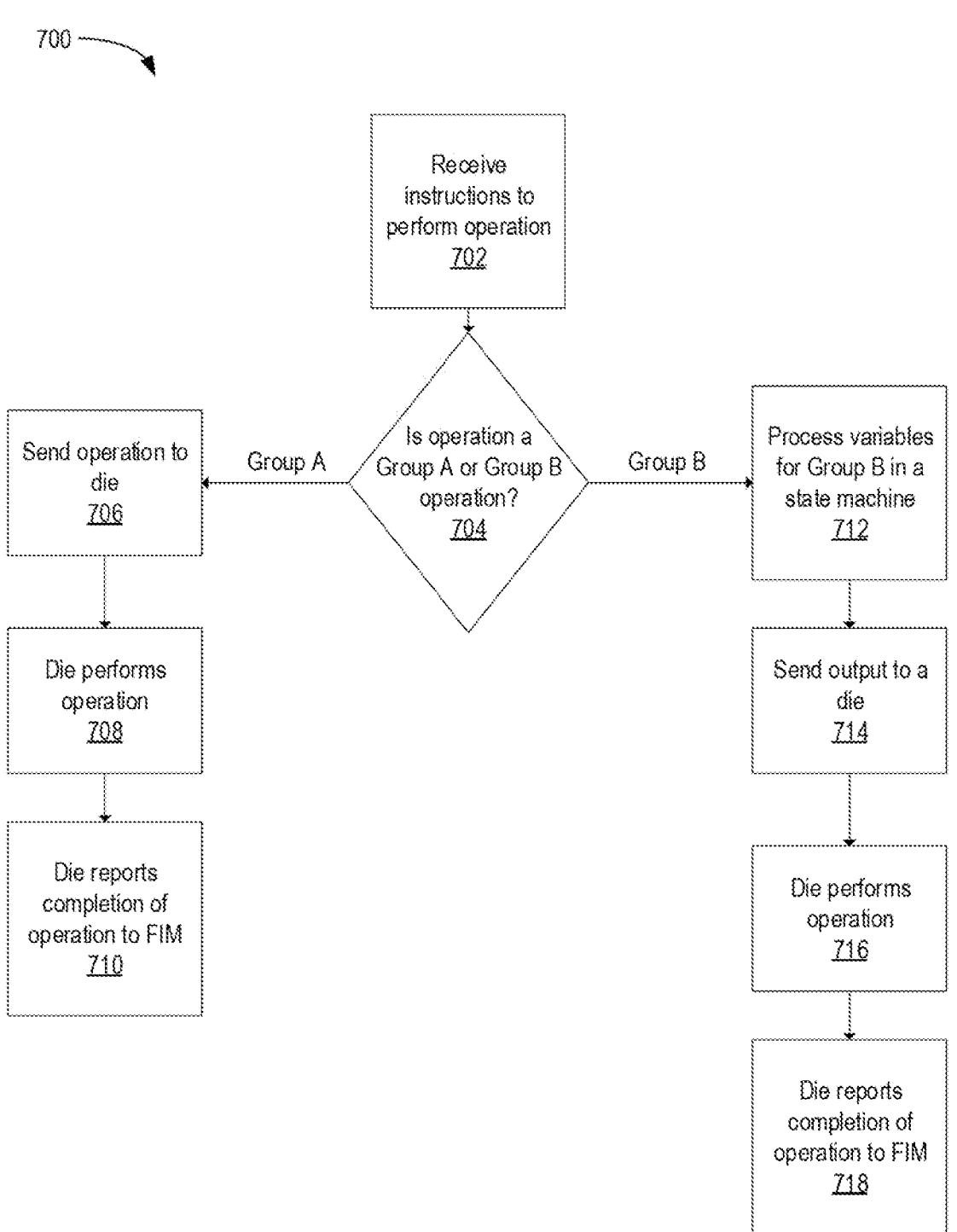
FIG. 7 is a flowchart illustrating a method for processing commands, according to certain embodiments.

FIG. 7 is a flowchart illustrating a method 700 for processing commands, according to certain embodiments. Method 700 is a constant cycle that runs as operations are received.

Method 700 begins at block 702. At block 702, the controller receives instructions to perform an operation. At block 704, the controller determines if the operation is either a Group A operation or a Group B operation. If the operation is a Group A operation, then method 700 proceeds to block 706. If the operation is a Group B operation, then method 700 proceeds to block 712. At block 706, if the operation is determined to be a Group A operation then the operation is sent to a die. At block 708, the die performs the operation that was sent to the die at block 706. At block 710, the die reports the completion of the operation to the FIM.

At block 712, if the operation is determined to be a Group B operation then method 700 processes variables from Group B in a state machine. At block 714, an output is sent to a die. At block 716, the same die as from the die in block

714 performs the operation. At block 718, the die reports the completion of the operation to the FIM.

Advantages of separating state machines into separate groups allows the system choose a die to best perform an operation. Separate state machine groups allows the system to run one state machine rather than all state machines. Choosing specific dies and state machines per operation leads to optimal system performance. Also separating state machines into separate groups decrease dramatically the cost of the memory storage system.

In one embodiment, a data storage device comprises: a memory device, wherein the memory device comprises a master die and one or more slave dies, and wherein the master die is configured to direct real time operations and non-real time operations to the one or more slave dies; and a controller coupled to the memory device, wherein the controller is configured to: direct real-time operations to the master die or to one or more slave dies; and direct the real time operations and the non-real time operations to the master die. Real-time operations are selected from the group consisting of: read transfer state machine operations, bit XOR operations, and combinations thereof. Non-real time operations are selected from the group consisting of: read temperature state machine operations, operations that are not parallel processed, and combinations thereof. The master die is coupled to the one or more slave dies. The master die includes RAM. The master die is configured to: load variables into a state machine, wherein the state machine is within the master die; process the variables to generate an output; and send the output to the one or more slave dies. The master die is configured to activate the one or more slave dies. The one or more slave dies are configured to report completion of the non-real time operations to the master die. The master die is configured to report completion of the non-real time operations to the controller. The one or more slave dies are configured to report completion of the real-time operations to the controller. The master die will receive the real-time operations for synchronization purposes. The controller comprises a plurality of flash interface modules (FIMs) and wherein each FIM of the plurality of FIMs is coupled to the master die.

In another embodiment, a data storage device comprising: a memory device comprising a plurality of dies; and a controller coupled to the memory device, the controller comprising: one or more flash interface modules (FIMs) coupled to the plurality of dies; and a slow state machine controller coupled to the one or more FIMs, wherein the controller is configured to: send real-time operations through the one or more FIMs to one of more dies of the plurality of dies; and send state machine output to the one or more dies for non-real time operations. The slow state machine controller sends the state machine output through the one or more FIMs to the one or more dies of the plurality of dies. The one or more dies do not include state machines for non-real time operations. The one or more dies are configured to report completion of the real-time operations to the controller using a ready/busy signal or sending register data that was read to the controller. The slow state machine controller is configured to process variables for non-real time operations in a state machine to generate the state machine output.

In another embodiment, a data storage device comprise: memory means; and a controller coupled to the memory means, wherein the controller includes a plurality of flash interface modules (FIMs), and wherein the controller is configured to: direct real-time operations to a first location of the memory means; direct parallel processing operations to the first location of the memory means; direct non-real time operations to one or more second locations of the memory means; and direct operations that do not require parallel processing to the one or more second locations of the memory means, wherein the one or more second locations of the memory means are configured to send output information from a state machine to the first location of the memory means. A first FIM of the plurality of FIMs is coupled to the first location and at least a location of the one or more second locations. A second FIM of the plurality of FIMs is coupled to other locations of the one or more second locations, wherein the other location of the one or more second locations is distinct from the location of the one or more second locations.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device, wherein the memory device comprises a master die and one or more slave dies, and wherein the master die is configured to direct non-real time operations to the one or more slave dies; and
a controller coupled to the memory device, wherein the controller is configured to:
    direct real-time operations to the one or more slave dies; and
    direct the real and non-real time operations to the master die, wherein real-time operations are selected from the group consisting of: read transfer state machine operations, bit XOR operations, and combinations thereof.

2. The data storage device of claim 1, wherein the master die is coupled to the one or more slave dies.

3. The data storage device of claim 1, wherein the master die includes RAM.

4. The data storage device of claim 1, wherein the master die is configured to:
    load variables into a state machine, wherein the state machine is within the master die;
    process the variables to generate an output; and
    send the output to the one or more slave dies.

5. The data storage device of claim 1, wherein the master die is configured to activate the one or more slave dies.

6. The data storage device of claim 1, wherein the one or more slave dies are configured to report completion of the non-real time operations to the master die.

7. The data storage device of claim 6, wherein the master die is configured to report completion of the non-real time operations to the controller.

8. A data storage device, comprising:
a memory device, wherein the memory device comprises a master die and one or more slave dies, and wherein the master die is configured to direct non-real time operations to the one or more slave dies; and
a controller coupled to the memory device, wherein the controller is configured to:
    direct real-time operations to the one or more slave dies; and
    direct the real and non-real time operations to the master die, wherein non-real time operations are selected from the group consisting of: read tempera-ture state machine operations, operations that are not parallel processed, and combinations thereof.

9. The data storage device of claim 8, wherein the one or more slave dies are configured to report completion of the real-time operations to the controller.

10. The data storage device of claim 8, wherein the master die will receive the real-time operations for synchronization purposes.

11. The data storage device of claim 8, wherein the controller comprises a plurality of flash interface modules (FIMs) and wherein each FIM of the plurality of FIMs is coupled to the master die.

12. A data storage device, comprising:
a memory device comprising a plurality of dies; and
a controller coupled to the memory device, the controller comprising:
    one or more flash interface modules (FIMs) coupled to the plurality of dies; and
    a slow state machine controller coupled to the one or more FIMs, wherein the controller is configured to:
        send real-time operations through the one or more FIMs to one of more dies of the plurality of dies, wherein real-time operations are selected from the group consisting of: read transfer state machine operations, bit XOR operations, and combinations thereof; and
        send state machine output to the one or more dies for non-real time operations, wherein non-real time operations are selected from the group consisting of: read temperature state machine operations, operations that are not parallel processed, and combinations thereof.

13. The data storage device of claim 12, wherein the slow state machine controller sends the state machine output through the one or more FIMs to the one or more dies of the plurality of dies.

14. The data storage device of claim 12, wherein the one or more dies do not include state machines for non-real time operations.

15. The data storage device of claim 12, wherein the one or more dies are configured to report completion of the real-time operations to the controller using a ready/busy signal or sending register data that was read to the controller.

16. The data storage device of claim 12, wherein the slow state machine controller is configured to process variables for non-real time operations in a state machine to generate the state machine output.

17. A data storage device, comprising:
memory means; and
a controller coupled to the memory means, wherein the controller includes a plurality of flash interface mod-ules (FIMs), and wherein the controller is configured to:
    direct real-time operations to a first location of the memory means, wherein real-time operations are selected from the group consisting of: read transfer state machine operations, bit XOR operations, and combinations thereof;
    direct parallel processing operations to the first location of the memory means;
    direct non-real time operations to one or more second locations of the memory means, wherein non-real time operations are selected from the group consist-ing of: read temperature state machine operations, operations that are not parallel processed, and com-binations thereof; and
    direct operations that do not require parallel processing to the one or more second locations of the memory means, wherein the one or more second locations of the memory means are configured to send output information from a state machine to the first location of the memory means.

18. The data storage device of claim 17, wherein a first FIM of the plurality of FIMs is coupled to the first location and at least a location of the one or more second locations.

19. The data storage device of claim 18, wherein a second FIM of the plurality of FIMs is coupled to other locations of the one or more second locations, wherein the other location of the one or more second locations is distinct from the location of the one or more second locations.

20. The data storage device of claim 17, wherein the data storage device does not include dynamic random access memory (DRAM).

* * * * *